United States Patent
Lam et al.

(10) Patent No.: US 9,240,855 B1
(45) Date of Patent: Jan. 19, 2016

(54) FIBER DIAGNOSIS SYSTEM FOR POINT-TO-POINT OPTICAL ACCESS NETWORKS

(71) Applicant: Google Inc., Mountain View, CA (US)

(72) Inventors: Cedric F. Lam, Milpitas, CA (US); James F. Kelly, Milpitas, CA (US); Austin B. Schuh, Los Altos, CA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 14/141,173

(22) Filed: Dec. 26, 2013

Related U.S. Application Data

(62) Division of application No. 12/985,041, filed on Jan. 5, 2011, now Pat. No. 8,655,167.

(51) Int. Cl.
*H04J 14/00* (2006.01)
*H04J 14/02* (2006.01)
*G01M 11/00* (2006.01)

(52) U.S. Cl.
CPC ........ *H04J 14/0227* (2013.01); *G01M 11/3109* (2013.01); *H04J 14/0212* (2013.01)

(58) Field of Classification Search
CPC ............ G01M 11/3109; H04J 14/0227; H04J 14/0212
USPC .......................................................... 398/16
See application file for complete search history.

(56) References Cited

U.S. PATENT DOCUMENTS

| | | | |
|---|---|---|---|
| 5,218,664 A | 6/1993 | O'Neill et al. | |
| 5,329,392 A * | 7/1994 | Cohen | 398/13 |
| 5,699,176 A | 12/1997 | Cohen | |
| 5,926,298 A | 7/1999 | Li | |
| 6,009,220 A | 12/1999 | Chan et al. | |
| 6,434,313 B1 | 8/2002 | Clapp, Jr. et al. | |

(Continued)

FOREIGN PATENT DOCUMENTS

EP     2 091 166 A1     8/2009

OTHER PUBLICATIONS

Hamacher, M. et al., "Coherent Receiver Front-End Module Including a Polarization Diversity Waveguide OIC and a High-Speed InGaAs Twin-Dual p-i-n Photodiode OEIC Both Based on InP", IEEE Photonics Technology Letters, vol. 4, No. 11, Nov. 1992, pp. 1234-1237.

(Continued)

*Primary Examiner* — Danny Leung
(74) *Attorney, Agent, or Firm* — Edward A. Gordon; Foley & Lardner LLP

(57) ABSTRACT

Implementations of techniques and systems are disclosed for detecting a fiber fault in a point-to-point optical access network based on optical time domain reflectometry ("OTDR") measurements. The techniques include identifying loss of service between a central office ("CO") and a given optical network unit ("ONU") of a plurality of ONUs. In response to the identifying the loss of service, configuring a test signal distribution unit to optically couple an OTDR unit to a selected subset of the point-to-point fiber links which includes the given ONU. An optical test signal is launched from the OTDR unit into the selected subset of the point-to-point fiber links via the test signal distribution unit. Test signal reflections are received from each of the point-to-point fiber links within the selected subset as a reflection signature, which is analyzed to identify a location of the fiber fault.

6 Claims, 6 Drawing Sheets

(56) References Cited

U.S. PATENT DOCUMENTS

| | | | |
|---|---|---|---|
| 6,778,752 B2 | 8/2004 | Laporte et al. | |
| 7,206,482 B2 | 4/2007 | Rhyne et al. | |
| 7,936,962 B2 | 5/2011 | Mudd et al. | |
| 8,320,760 B1 | 11/2012 | Lam et al. | |
| 8,655,167 B1 * | 2/2014 | Lam | H04B 10/071 398/16 |
| 8,693,866 B1 * | 4/2014 | Lam | H04B 10/071 398/13 |
| 2002/0145775 A1 | 10/2002 | Effenberger et al. | |
| 2005/0207711 A1 | 9/2005 | Vo et al. | |
| 2006/0007426 A1 * | 1/2006 | Weller | 356/73.1 |
| 2006/0153565 A1 | 7/2006 | Park et al. | |
| 2006/0257148 A1 | 11/2006 | Hirth et al. | |
| 2007/0206898 A1 | 9/2007 | Wang et al. | |
| 2008/0267627 A1 | 10/2008 | Effenberger | |
| 2009/0060521 A1 | 3/2009 | Lin et al. | |
| 2009/0202246 A1 | 8/2009 | Kashima | |
| 2009/0263122 A1 | 10/2009 | Helkey et al. | |
| 2010/0054740 A1 | 3/2010 | Lee et al. | |
| 2010/0142955 A1 | 6/2010 | Yu et al. | |
| 2010/0196011 A1 | 8/2010 | Liu et al. | |
| 2010/0290782 A1 | 11/2010 | Lee et al. | |
| 2011/0182578 A1 | 7/2011 | Cavaliere | |
| 2011/0236017 A1 | 9/2011 | Ohlen | |
| 2011/0243552 A1 | 10/2011 | Mitchell et al. | |
| 2011/0262131 A1 | 10/2011 | Gottwald et al. | |
| 2011/0268438 A1 * | 11/2011 | Daems | H04B 10/071 398/16 |
| 2011/0274433 A1 | 11/2011 | Presi et al. | |

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, JDSU Uniphase Corporation, 2005, 8 pages.

"ONMS PON Centralized Remote PON Test System", <http://www.jdsu.com/product-literature/onmspon_br_fop_tm_ae.pdf>, JDSU Uniphase Corporation, Jun. 2009, 4 pages.

NetCracker, "Comprehensive Telecom Operations and Management Solutions, Product Overview", NetCracker Technology Corp, 2010, 2 pages.

"Homodyne detection", From Wikipedia, the free encyclopedia, <http://en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Optical_heterodyne_detection> retrieved from Internet on Jul. 11, 2011, 5 pages.

U.S. Office Action mailed Dec. 27, 2012, U.S. Appl. No. 12/985,041, filed Jan. 5, 2011, 10 pages.

U.S. Office Action mailed May 16, 2013, U.S. Appl. No. 12/985,041, filed Jan. 5, 2011, 14 pages.

U.S. Notice of Allowance mailed Nov. 4, 2013, U.S. Appl. No. 12/985,041, filed Jan. 5, 2011, 14 pages.

* cited by examiner

FIBER DIAGNOSIS SYSTEM FOR POINT-TO-POINT OPTICAL ACCESS NETWORKS

REFERENCE TO RELATED APPLICATIONS

This application is a divisional of U.S. application Ser. No. 12/985,041, filed Jan. 5, 2011.

TECHNICAL FIELD

This disclosure relates generally to fiber optic networks, and in particular but not exclusively, relates to diagnostic equipment for fiber optic networks.

BACKGROUND INFORMATION

Fiber networks can be used to transport light that is modulated to carry information and to deliver communication services in various configurations, including broadband fiber-to-the-premise ("FTTP") communication services. In order to promote widespread deployment of FTTP broadband infrastructure, it is desirable to reduce the cost of fiber plant construction, which consists of as much as 80% of the total cost for FTTP deployments and is dominated by labor costs in developed countries. Techniques that can reduce this upfront expense associated with the initial fiber plant can further this goal. However, ongoing operation and maintenance expenses associated with the fiber plant also impact the adoption rate of FTTP communication services. One such expense is the detection and location of fiber faults (e.g., a fiber cut or breakage) that interrupt communication services. Such detection is necessary for repairing the broken fiber link and restoring the communication services. Techniques that can quickly and efficiently detect and locate these faults reduce the operation and maintenance expenses and further encourage adoption of FTTP communication services. In addition, these techniques shorten service outage time and improve user experiences.

SUMMARY OF INVENTION

Implementations of techniques and systems are provided for a point-to-point (pt-2-pt) optical access network that includes a test signal distribution unit for multiplexing an optical test signal across many pt-2-pt fiber links to efficiently identify and locate fiber faults.

In one aspect, a method is provided for detecting a fiber fault in a pt-2-pt optical access network based on optical time domain reflectometry ("OTDR") measurements. The method includes identifying loss of service between a central office ("CO") and a given optical network unit ("ONU") of a plurality of ONUs coupled to the CO via pt-to-pt fiber links. The given ONU is coupled to the CO via a given pt-to-pt fiber link. In response to identifying the loss of service, a test signal distribution unit is configured to optically couple an OTDR unit to a selected subset of the pt-to-pt fiber links. The selected subset includes the given pt-to-pt fiber link extending towards the given ONU. An optical test signal is launched from the OTDR unit into the selected subset of the pt-to-pt fiber links via the test signal distribution unit. Test signal reflections are received from each of the pt-to-pt fiber links within the selected subset as a reflection signature. The reflection signature is analyzed to identify a location of the fiber fault.

In another aspect, a tangible machine-readable storage media provides instructions that, when executed by one or more machines, will cause the one or more machines to perform operations. These operations include identifying loss of service between a central office ("CO") and a given optical network unit ("ONU") of a plurality of ONUs coupled to the CO via pt-2-pt fiber links. The given ONU is coupled to the CO via a given pt-2-pt fiber link. In response to identifying the loss of service, a test signal distribution unit is configured to optically couple an OTDR unit to a selected subset of the pt-2-pt fiber links. The selected subset including the given pt-2-pt fiber link extending towards the given ONU. An optical test signal is launched from the OTDR unit into the selected subset of the pt-2-pt fiber links via the test signal distribution unit. Test signal reflections are received from each of the pt-2-pt fiber links within the selected subset as a reflection signature. The reflection signature is analyzed to identify a location of the fiber fault between the CO and the given ONU.

In yet another aspect, an apparatus is provided that includes an optical line terminal ("OLT"), an optical time domain reflectometry ("OTDR unit"), and a test signal distribution unit. The OLT includes transceivers each for coupling to a corresponding one of a plurality of pt-2-pt fiber links of a fiber-to-the-premise ("FTTP") network. The OTDR unit generates an optical test signal and receives test signal reflections for obtaining OTDR measurements from the FTTP network. The test signal distribution unit couples to the OLT and the OTDR unit to selectively multiplex the optical test signal from the OTDR unit onto the pt-2-pt fiber links. The test signal distribution unit is further coupled to intercept the test signal reflections prior to reaching the OLT and direct the test signal reflections back to the OTDR unit. The test signal distribution unit is further coupled to pass optical data signals between the FTTP network and the OLT.

These and other aspects and embodiments are described in detail in the drawings, the description, and the claims.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
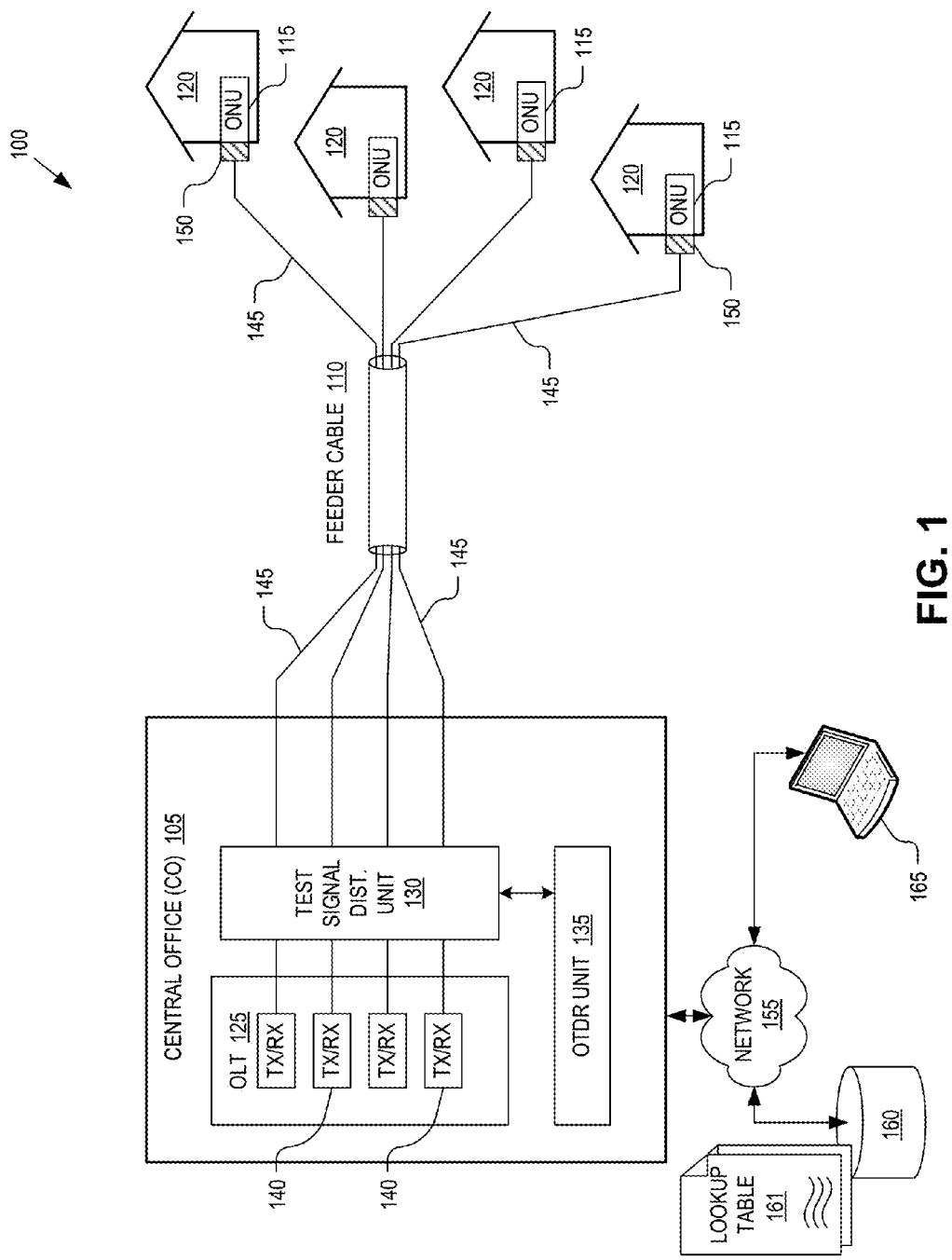
FIG. 1 is a functional block diagram illustrating a point-to-point ("pt-2-pt") fiber-to-the-premise ("FTTP") access network, in accordance with an embodiment of the invention.

Embodiments of a system and method of operation of a point-to-point (pt-2-pt) fiber-to-the-premise ("FTTP") access network that includes a test signal distribution unit for multiplexing an optical time domain reflectometry ("OTDR") unit across many pt-2-pt fiber links to efficiently identify and locate fiber faults are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FTTP is the ultimate future-proof broadband access network infrastructure, which is essential for long-term economic growth. One option for implementing an FTTP access network uses a passive optical network ("PON") architecture. A PON is a point-to-multipoint optical network that uses unpowered optical splitters to enable a single fiber to server multiple customer premises (e.g., 32 to 128 customer premises). Another option for FTTP is to string a separate homerun fiber from a carrier central office ("CO") all the way to each customer premise ("CP"). Such architecture is called a point-2-point architecture (pt-2-pt) as opposed to PON's point-to-multipoint architecture.

FTTP deployment is so capital intensive that many broadband access infrastructure providers are feverishly looking for methods to lower the deployment cost and the ensuing operating cost. OTDR is a measurement technique used to quickly and efficiently diagnose a fiber plant and identify the location of a fiber fault that brings down or otherwise degrades a transmission link. OTDR can be applied to a faulty fiber link to localize faults such as a fiber cut, a macro bend, etc. OTDR gives the physical distance of the fiber fault (called events) from the source where the OTDR test signal is launched. When combined with geographic information system ("GIS") data regarding the physical routes of the fiber plant and knowledge of which customer has lost communication with the central office providing the communication services, OTDR can be leveraged to quickly and efficiently identify and map the fiber fault location. As such, an effective fault diagnosis strategy that leverages the advantages of OTDR can help reduce the operating costs of an FTTP access network.

OTDR fault diagnosis starts with identifying the fiber link associated with the CP that has lost service. A loss of service may be a complete loss of communication with the CO or an unacceptable degradation of the communication link. Once the fiber link is identified, an optical test signal is launched at the head end into the faulty fiber link and the head end of the link is monitored for reflections or a "reflection signature" which may be analyzed to identify the location of the fiber fault. Since a pt-2-pt access network requires a homerun fiber termination to each CP, a large number of fiber links are terminated in the CO. In fact, a CO in an urban or suburban neighborhood can expect to terminate as many as 50,000 pt-2-pt fiber links extending to various CPs. Conventionally, a technician physically present at the CO is needed to identify and manually couple the OTDR unit to the faulty fiber link. To speed up fiber diagnosis for pt-2-pt access networks, an OTDR test system needs the capability to pre-connect each homerun access fiber with an OTDR unit or have the capability to automatically switch a shared ODTR unit to the right fiber link. Brute-force methods include coupling a single OTDR per fiber link or a very large-port-count optical switch can be used to multiplex the OTDR unit across a large number of fiber links. However, such brute-force approaches are prohibitively expensive.

FIG. 1 is a functional block diagram illustrating a pt-2-pt FTTP access network 100, in accordance with an embodiment of the invention. The illustrated embodiment of access network 100 includes a CO 105, a feeder cable 110, and a plurality of optical network units ("ONUs") 115 each located at a customer premise 120. The illustrated embodiment of CO 105 includes an optical line terminal ("OLT") 125, a test signal distribution unit ("TSDU") 130, and an OTDR unit 135. The illustrated embodiment of OLT 125 includes transceivers 140 each coupled to a fiber link. Transceivers 140 communicate (e.g., transmit and receive) optical data signals with ONUs 115 for delivering the communicating services into customer premises 120.

Feeder cable 110 extends from CO 105 into a neighborhood of customer premises 120, which represent potential or existing customers of the service provider. Feeder cable 110 may run along a utility right-of-way running adjacent to a neighborhood street that passes by customer premises 120. Feeder cable 110 carries the individual pt-2-pt fiber links 145 that run to each ONU 115 bundled together. At various locations along the feeder cable 110 plant, the individual fiber links 145 are routed out of the feeder cable jacket and towards the individual customer premises 120. Feeder cable 110 may be a subterranean fiber plant, a suspended fiber plant (e.g., suspended along telephone poles), or otherwise.

Fiber links 145 are each terminated on the CP side by an optical demarcation device 150 positioned just upstream of ONU 115. Demarcation devices 150 provide a well-defined demarcation identification point between the customer premise equipment ("CPE") including ONUs 115 and the carrier's fiber plant. Demarcation device 150 may serve to demark the terminal point of maintenance responsibility for the carrier. In one embodiment, demarcation devices 150 each include a wavelength selective reflector that is reflective to the optical test signal output by OTDR unit 135 (e.g., in the 1625-1670 nm optical band) while transmissive to the upstream and downstream data signals communicated between OLT 125 and ONUs 115 (e.g., 1310 nm upstream and 1490 nm downstream).

Fiber optic network 100 may further include diagnostic equipment to aid in the identification and location of fiber faults (e.g., breaks, kinks, etc.) in the fiber plant. This diagnostic equipment may include a network 155, a database 160, and an interface computing device 165. The interface computing device 165 may be a portable computer taken on-site with a technician during repair service calls and can remotely communication with CO 105, including OTDR unit 135 and TSDU 130, or database 160 via network 155. Through interface computing device 165, a technician can communicate with OLT 125 to identify the specific ONU(s) 115 which has/have a loss of service, configure TSDU 130 to select a subset of fiber links 145 for testing, instruct OTDR unit 135 to launch an optical test signal into the subset of fiber links 145, retrieve real-time results from the test (e.g., a reflection signature or OTDR trace), access database 160 to retrieve a reference reflection signature and GIS map data detailing the physical routes of fiber links 145, compare the current reflection signature against the reference reflection signature to identify a location of the fault through a computing algorithm, and even map the location using the GIS map data. In one embodiment, database 160 stores a lookup table 161 that correlates each ONU 115 with specific configuration settings of TSDU 130. Greater details of the operation of OTDR unit 135 and TSDU 130 are discussed below.

Figure 2:
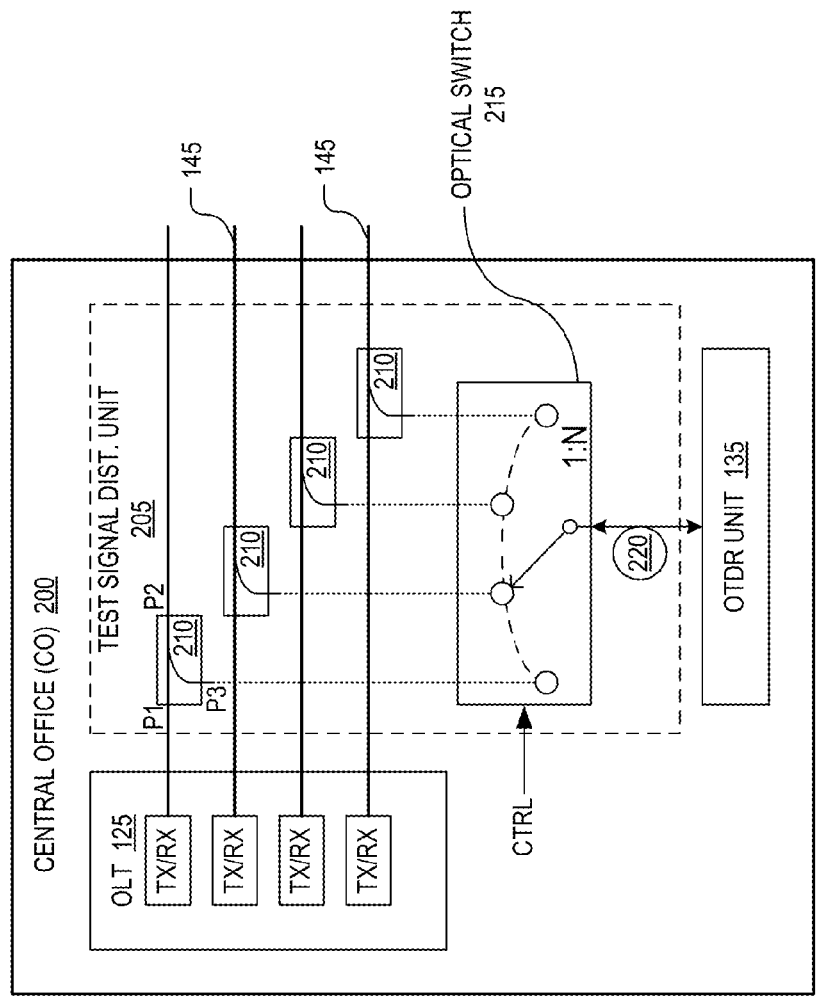
FIG. 2 is a functional block diagram illustrating a central office ("CO") of a pt-2-pt FTTP access network that includes a test signal distribution unit for multiplexing an optical time domain reflectometry ("OTDR") unit across many pt-2-pt fiber links, in accordance with an embodiment of the invention.

FIG. 2 is a functional block diagram illustrating a CO 200 including a TSDU 205 for multiplexing OTDR unit 135 across many pt-2-pt fiber links 145, in accordance with an embodiment of the invention. TSDU 205 is one possible implementation of TSDU 130 illustrated in FIG. 1, which is capable of remote controlled, automated multiplexing of OTDR unit 135. The illustrated embodiment of TSDU 205 includes 3-port wavelength-selective optical couplers 210, a port-to-multiport optical switch 215, and a dead-zone remover 220.

TSDU 205 operates by optically coupling OTDR unit 135 to any of fiber links 145 in response to a control signal CTRL. This is achieved by using a 1:N wide port optical switch 215 and wavelength selective 3-port optical couplers 210. In this approach, the OTDR optical test signal is coupled onto a single selected fiber link 145. The optical couplers 210 operate as wavelength selective add/drop couplers. Wavelength selective optical couplers 210 pass the data wavelengths between ports P1 and P2 without significant loss or alteration, while being capable of "adding" or inserting the optical test signal received on port P3 onto the fiber link in the downstream direction (i.e., out port P2). Correspondingly, optical test signal reflections received on port P2 are dropped from the fiber link before reaching OLT 125 and diverted back out port P3 towards OTDR unit 135 via optical switch 215. Dead-zone remover 220 is inserted between OTDR unit 135 and optical switch 215 to introduce a travel delay sufficiently large such that the first reflections received at OTDR unit 135 do not arrive until after the entire optical test signal has been transmitted (e.g., to remove the OTDR blind spot in the fiber plant under test). In one embodiment, dead-zone remover 220 is 2 km length of fiber. Dead-zone remover 220 may not be required for all OTDR equipment.

The configuration of TSDU 205 illustrated in FIG. 2 requires use of a wide port 1:N optical switch, where N equals the number of fiber links 145 capable of being tested. Current optical switches are rated for approximately N=300, which is about two orders of magnitude too small. At current price levels per port of optical switch 215, this approach is also prohibitively expensive. However, it is foreseeable that one day this approach may be both technologically and economically viable on much larger scale, if not currently so.

Figure 3:
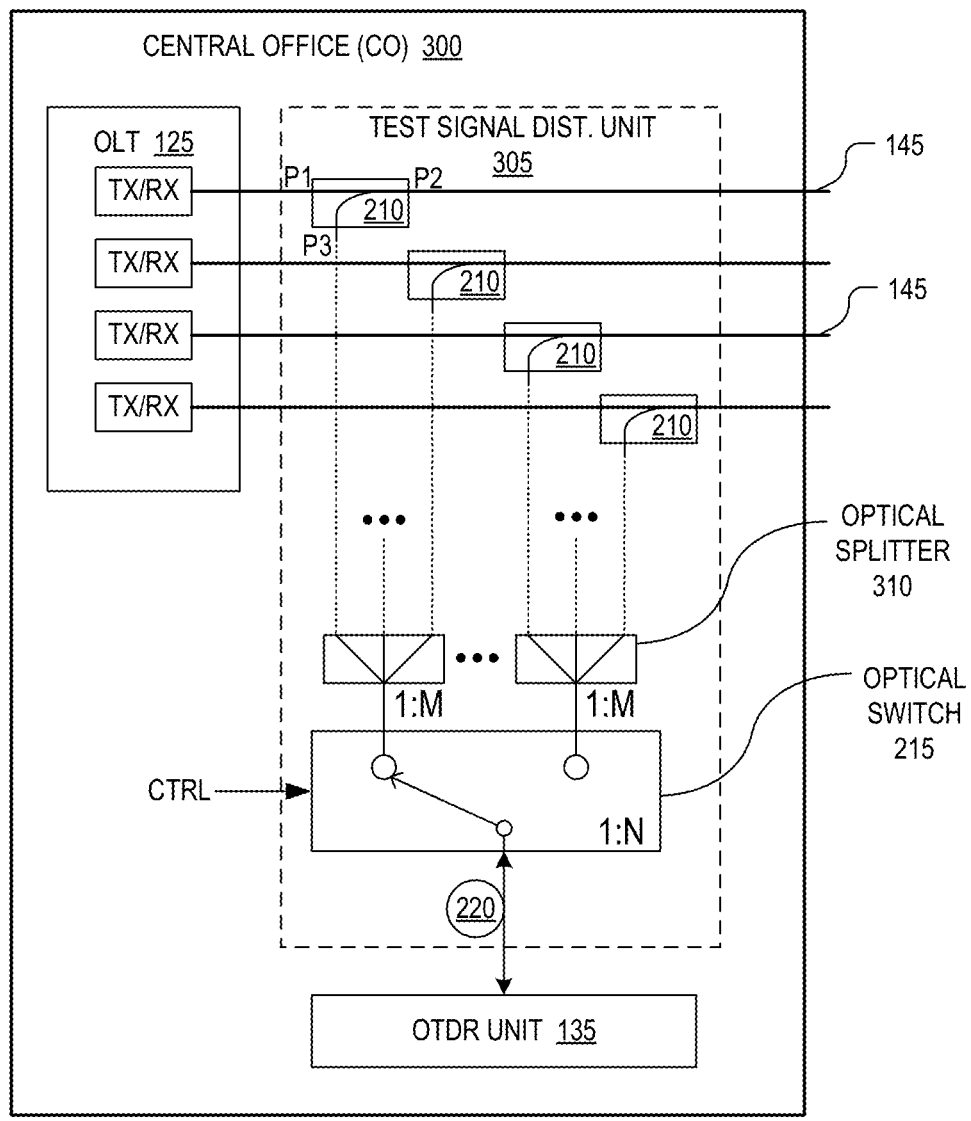
FIG. 3 is a functional block diagram illustrating a CO of a pt-2-pt FTTP access network that includes a test signal distribution unit for multiplexing an OTDR unit across many pt-2-pt fiber links, in accordance with an embodiment of the invention.

FIG. 3 is a functional block diagram illustrating a CO 300 including a TSDU 305 for multiplexing OTDR unit 135 across many pt-2-pt fiber links 145, in accordance with an embodiment of the invention. TSDU 305 is one possible implementation of TSDU 130 illustrated in FIG. 1, which is capable of remotely controlled, automated multiplexing of OTDR unit 135. TSDU 305 is similar to TSDU 205 expect for the additional inclusion of multiple 1:M optical splitters 310 between optical switch 215 and optical couplers 210.

This two tier multiplexing approach using optical splitters 310 coupled between optical switch 215 and optical couplers 210, enables OTDR unit 135 to be multiplexed across a greater number of fiber links 145. This also relieves the burden on optical switch 215 to perform all of the multiplexing. In the embodiment of FIG. 2, a single OTDR unit 135 can be shared by only N fiber links 145. In the embodiment of FIG. 3, OTDR unit 135 can be shared by N×M fiber links 145. Example values for M include 16 or 32, while N may be 64, 128, 256. Of course other combinations and values for M and N may be implemented.

When optical switch 215 selects a given port in response to the control signal CTRL, OTDR unit 135 is coupled to a subset of fiber links 145 (i.e., all the fiber links coupled to the given optical splitter 310 that is coupled to the selected port). In doing so, the selected subset of pt-2-pt fiber links 145 is perceived by OTDR unit 135 as a PON. Thus the embodiment of FIG. 3 takes an optical access network that from a data communication perspective between OLT 125 and ONUs 115 is a collection of pt-2-pt fiber links 145 and characterizes the subsets of the pt-2-pt fiber links 145 into PONs. The reflected optical signals received at OTDR unit 135 will characterize each subset of fiber links 145 coupled to a given optical splitter 310 as a PON, rather than a pt-2-pt fiber link. When testing a given fiber link 145 associated with an ONU 115 that has lost service, the entire subset of fiber links 145 are tested. Thus a reflection signature including reflections from each fiber link 145 in the subset is analyzed as opposed to a single reflection signal from a single pt-2-pt fiber link 145.

When determining a scheme to group the individual fiber links 145 into subsets for coupling to a given optical splitter 310, an intelligent algorithm may be applied, the grouping may be merely random, the grouping may be neighborhood based, or otherwise. For the algorithm based scheme, an automated software program may create grouping assignments using GIS data describing the lengths of each fiber run to ensure sufficient length differentials (e.g., threshold length differentials) for each fiber link 145 coupled to a given optical splitter 310, so that reflections from the demarcation points 150 connected to individual fiber links 145 can be resolved by the OTDR unit 135. Ensuring sufficient length differentials can help avoid scenarios where substantially equal length fiber links 145 are coupled into the same test PON, thus reducing the usefulness of the reflection signature for the given test PON.

Figure 4:
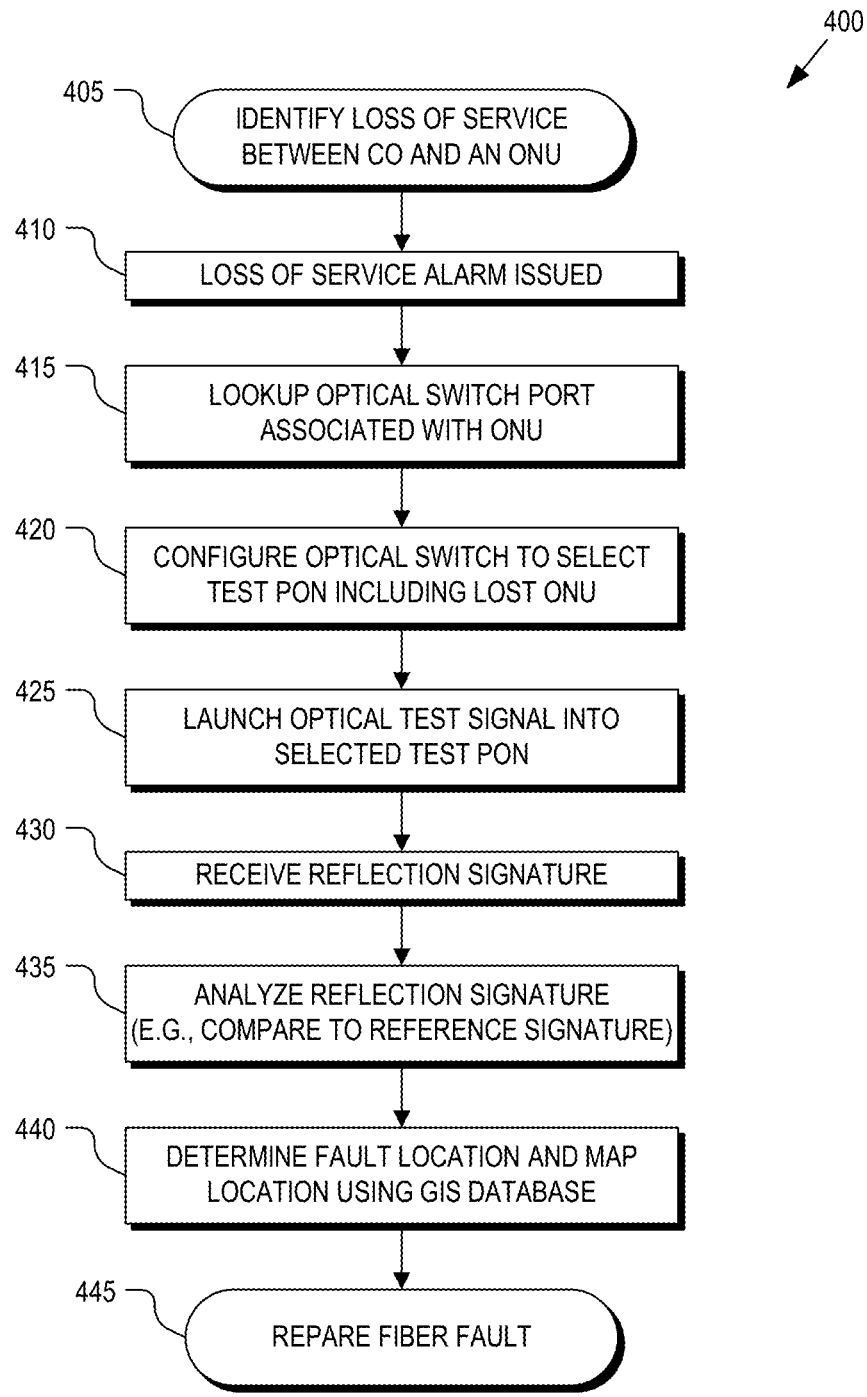
FIG. 4 is a flow chart illustrating a process of operation of a pt-2-pt FTTP access network that includes a test signal distribution unit for multiplexing an OTDR unit across many pt-2-pt fiber links to identify and locate fiber faults, in accordance with an embodiment of the invention.

FIG. 4 is a flow chart illustrating a process 400 of operation for testing access network 100 using OTDR unit 135 multiplexed by TSDU 130 to identify and locate fiber faults, in accordance with an embodiment of the invention. The order in which some or all of the process blocks appear in process 400 should not be deemed limiting. Rather, one of ordinary skill in the art having the benefit of the present disclosure will understand that some of the process blocks may be executed in a variety of orders not illustrated.

In a process block 405, OLT 125 loses service with one or more ONUs 115. A loss of service may include a complete loss of communication or a threshold degradation in expected service characteristics. In a process block 410, the loss of service results in issuance in a loss of service alarm. This alarm may automatically evoke a test protocol that commissions OTDR unit 135 to perform an OTDR measurement of the faulty link and/or may post a service warning to an administrator/technician. In response the administrator may remotely commission OTDR unit 135 to perform the OTDR measurement. In either case, an identity tag associated with the ONU 115 that has a faulty link is used to retrieve configuration settings (process block 415) and configure TSDU 130 to couple OTDR unit 135 to the fiber link 145 associated with the ONU 115 (process block 420). In one embodiment, TSDU 130 couples OTDR unit 135 to a subset of fiber links 145 that includes the fiber link 145 of the ONU 115 having a loss of service. Coupling OTDR unit 135 to a subset of fiber links 145 results in setting up a test PON with the subset of pt-2-pt fiber links 145 coupled to the designated optical splitter 310. In one embodiment, retrieving the configuration settings includes using the identity tag (e.g., a MAC address of the failing ONU, a static IP address associated with the failing ONU, or other identifier uniquely associated with the failing ONU) to index into lookup table 161 to acquire the requisite port configuration setting for optical switch 215.

In a process block 425, OTDR unit 135 launches an optical test signal into TSDU 130, which is routed to the appropriate fiber link 145 or subset (test PON) of fiber links 145. In the embodiment of FIG. 3, the optical test signal is reflected and returns to OTDR unit 135 as a reflection signature of a PON (process block 430). The reflection signature of a PON is the sum of all reflections by demarcation devices 150 in the fiber links 145 that have no fiber faults and the reflection at the location of the fiber fault, in the event a fiber fault is present in one of the fiber links 145 of the test subset.

Figure 5A:
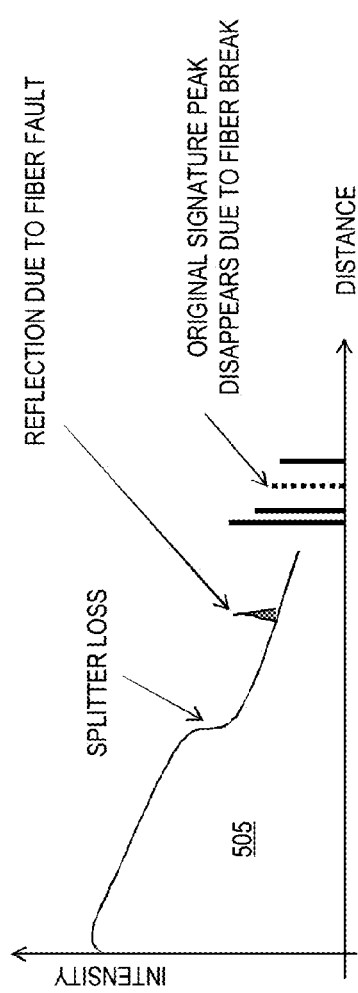
FIGS. 5A and 5B include charts illustrating demonstrative operation of an OTDR diagnostic process, in accordance with an embodiment of the invention.

An example reflection signature 505 including multiple reflections having different intensity peaks at different distances observed by OTDR unit 135, is illustrated in FIG. 5. Although OTDR unit 135 is testing a pt-2-pt optical access network, reflection signature 505 is typical of a PON system. As a result, the aggregation of all the reflections from all the demarcation devices 150 forms a reflection signature, which includes a peak corresponding to the fiber fault. Each optical splitter 310 is observed in the reflection signature of each test PON as a splitting node having an associated signal drop due to the splitting loss.

Figure 5B:
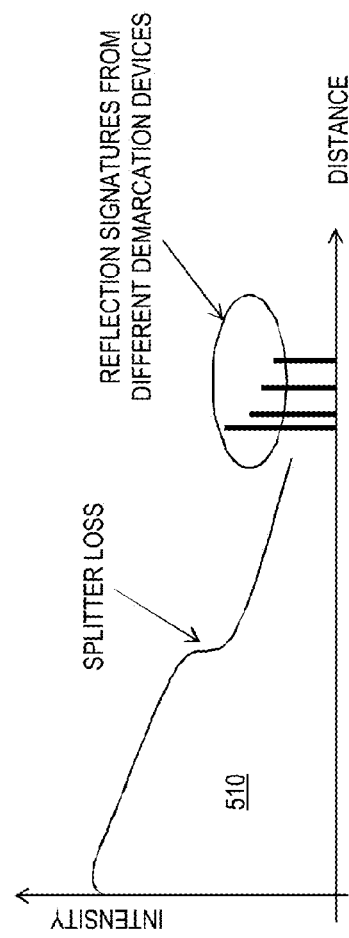

In a process block 435, the reflection signature is analyzed to determine if a fiber fault exists, and if so, where the fiber fault is located. In one embodiment, the reflection signature is analyzed by comparing it to a reference reflection signature stored for the given test PON (i.e., selected optical splitter 310). FIG. 5B illustrates an example reference signature 510. A reference test signature is stored for each optical splitter 310. The reference signature may be obtained during testing conducted after the initial fiber plant and during subsequent service intervals when new ONUs 115 are added to a given subset. The reference test signatures characterize each subset of pt-2-pt fiber links 145 as a unique test PON. If a new reflection peak is present in the newly acquired reflection signature 505 and an existing peak in the reference reflection signature 510 is either gone or smaller, then a fiber fault can be assumed to be present in the associated fiber link 145. If the newly acquired reflection signature 505 is identical to the stored reference reflection signature 510, then it can be assumed that the loss of service is due to an error in the CPE and not in the fiber plant.

If a fiber fault is determined to be present, then the location of the fiber fault is determined in process block 440. The location can be determined by referencing GIS data detailing the location and length of the fiber routes and comparing that information to the distance associated with the fiber fault peak identified in reflection signature 505. Furthermore, knowledge of which ONU(s) 115 is/are experiencing the loss of service can also aid in eliminating healthy fiber links 145 and pin-pointing the fault location. In one embodiment, the location of the fiber fault is further mapped using a mapping program such as Google Earth™. Finally, in a process block 445, a technician can be dispatched to repair the fiber fault.

Figure 6:
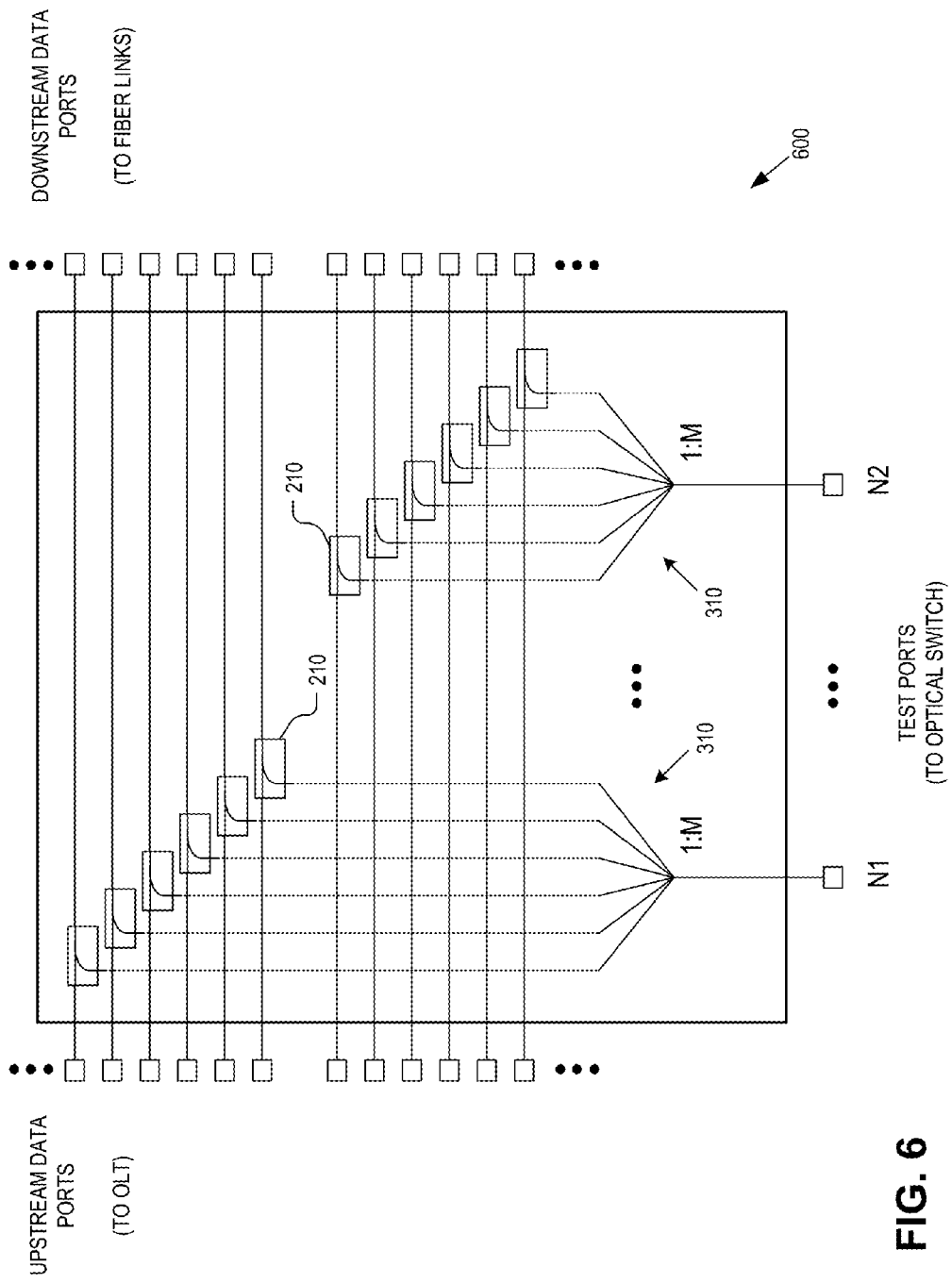
FIG. 6 is a functional block diagram illustrating a multiplexing unit having multiple optical wavelength-selective couplers and optical splitters integrated into a single physical unit, in accordance with an embodiment of the invention.

FIG. 6 is a functional block diagram illustrating a multiplexing unit 600 having multiple optical couplers and optical splitters integrated into a single physical unit, in accordance with an embodiment of the invention. Multiplexing unit 600 may be used to group multiple instances of optical couplers 210 and optical splitters 310 into a single physical unit to simplify and speed up deployment in the field. For example, multiplexing unit 600 may include four 1:16 optical splitters 310 each coupled to 16 optical couplers 210 and associated upstream/downstream optical ports for coupling to OLT 125 and fiber links 145, respectively. Of course, multiplexing unit 600 may be implemented with greater or fewer optical splitters 310 have greater or fewer splitting factors. Multiplexing unit 600 reduces the number of discrete components that must be connected at the CO 105 during initial deployment. In various embodiments, multiplexing unit 600 may be implemented using discrete components within a box or mounted to a substrate, integrated into a silicon wafer, or otherwise.

The processes explained above are described in terms of computer software and hardware. The techniques described may constitute machine-executable instructions embodied within a tangible machine (e.g., computer) readable storage medium, that when executed by a machine will cause the machine to perform the operations described. Additionally, the processes may be embodied within hardware, such as an application specific integrated circuit ("ASIC") or the like.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a tangible machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
   an optical line terminal ("OLT") including transceivers each for coupling to a corresponding one of a plurality of point-to-point fiber links of a fiber-to-the-premise ("FTTP") network;
   an optical time domain reflectometry ("OTDR") unit to generate an optical test signal and to receive test signal reflections for obtaining OTDR measurements from the FTTP network; and
   a test signal distribution unit coupled to the OLT and the OTDR unit to selectively multiplex the optical test signal from the OTDR unit onto the point-to-point fiber links, coupled to intercept the test signal reflections prior to reaching the OLT and direct the test signal reflections back to the OTDR unit, and coupled to pass optical data signals between the FTTP network and the OLT, wherein the test signal distribution unit comprises:
   a plurality of 3-port optical couplers each coupled to a corresponding one of the point-to-point fiber links, the 3-port optical couplers being wavelength selective couplers that each pass the optical data signals between the FTTP network and the OLT along first and second ports while diverting the test signal reflections received on the second port to a third port, and an optical switch having a first port coupled to the OTDR unit and a plurality of second ports coupled to the 3-port optical couplers, and a plurality of optical splitters coupled between the second ports of the optical switch and the third port of the 3-port optical couplers, each of the optical splitters coupling a subset of the point-to-point fiber links to a given one of the second ports of the optical switch.

2. The apparatus of claim 1, wherein the optical switch comprises a 1:n optical switch and the optical splitters comprise 1:m optical splitters, wherein n and m are each greater than two.

3. The apparatus of claim 2, wherein a portion of the 3-port optical couplers and a portion of the optical splitters are integrated into a single physical multiplexing unit that includes upstream and downstream data ports for coupling the OLT and the FTTP network, respectively, and test signal ports for coupling to the optical switch.

4. The apparatus of claim 1, further comprising:
a lookup table stored within a database that indexes unique identifiers for each optical network unit ("ONU") coupled to the point-to-point fiber links to configuration settings of the optical switch that select a given port of the optical switch to test a given point-to-point fiber link associated with a given ONU, wherein the point-to-point fiber links are indexed into groups of point-to-point fiber links coupled per optical splitter.

5. The apparatus of claim 1, wherein the test signal distribution unit is configurable to multiplex the optical test signal generated by the OTDR unit onto a selectable subset of the point-to-point fiber links, wherein the OTDR unit is configurable to receive the test signal reflections from the selectable subset of the point-to-point fiber links as a reflection signature.

6. The apparatus of claim 5, wherein the reflection signature comprises:

a first group of reflections reflected off of demarcation devices located at respective optical network units ("ONUs") that reflect the optical test signal while passing data signals to the ONUs; and a fault reflection due to a fiber fault at a location of the fiber fault instead of a reflection from a given demarcation device associated with a given ONU.

* * * * *